US006912790B2

(12) United States Patent
James et al.

(10) Patent No.: US 6,912,790 B2
(45) Date of Patent: Jul. 5, 2005

(54) HANDLE ARRANGEMENT FOR A RECIPROCATING SAW

(75) Inventors: Thomas Paul James, Oconomowoc, WI (US); Roger Dean Neitzell, North Prairie, WI (US); Troy Charles Thorson, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 306 days.

(21) Appl. No.: 10/011,251

(22) Filed: Dec. 3, 2001

(65) Prior Publication Data

US 2003/0101600 A1 Jun. 5, 2003

(51) Int. Cl.[7] ................................................ B23D 49/11
(52) U.S. Cl. ........................................ 30/392; 30/519
(58) Field of Search .................. 30/517, 519, 392–394, 30/228, 122, 226; 16/110.1; 408/124, 241 R; 451/344

(56) References Cited

U.S. PATENT DOCUMENTS

| | | |
|---|---|---|
| 1,978,369 A | 10/1934 | Levin |
| 2,293,859 A | 8/1942 | Scott |
| 2,348,266 A | 5/1944 | Selby |
| 2,414,637 A | 1/1947 | Crump |
| 3,028,890 A | 4/1962 | Atkinson et al. |
| 3,785,053 A | 1/1974 | Michaelson |
| 3,876,015 A | 4/1975 | Kivela |
| 4,462,282 A | 7/1984 | Biek |
| 4,785,540 A | 11/1988 | Arvidsson |
| 5,201,146 A | 4/1993 | Fushiya |
| 5,375,666 A | 12/1994 | Pettet et al. |
| 5,466,183 A | 11/1995 | Kirn et al. |
| 5,533,581 A | 7/1996 | Barth et al. |
| D377,303 S | 1/1997 | Nagel |
| 5,681,214 A | 10/1997 | Kleider et al. |
| 5,687,802 A | 11/1997 | Spooner et al. |
| 5,697,158 A | * 12/1997 | Klinzing et al. ........... 30/166.3 |

(Continued)

FOREIGN PATENT DOCUMENTS

| | | |
|---|---|---|
| DE | 4116343 | 11/1992 |
| EP | 0267472 | 2/1980 |
| EP | 0768138 A2 | 4/1997 |
| EP | 0768138 | 4/1997 |
| GB | 2026928 | 5/1988 |
| WO | 9220491 | 11/1992 |

OTHER PUBLICATIONS

Parts list for Porter Cable Corporation, Model No. 7414, Right Angle Grinder, Copyright 2000.
Porter Cable Corporation, Model No. 7415, Right Angle Grinder/Sander, Copyright 2001.

Primary Examiner—Douglas D. Watts
(74) Attorney, Agent, or Firm—Michael Best & Friedrich, LLP

(57) ABSTRACT

A power tool, such as a reciprocating saw, including a spindle for supporting a tool element, a body defining a pivot axis and housing a motor and a drive mechanism driven by the motor, the drive mechanism driving the spindle, the body having a forward end supporting the spindle and a rearward end, and a grip connected to the rearward end of the body for pivoting movement about the pivot axis. The reciprocating saw may include a locking assembly for locking the grip in a pivoted position relative to the body and a switch assembly at least partially supported on the grip. The switch assembly is preferably inoperable when the locking assembly is in an unlocked condition, and the locking assembly preferably cannot be moved to the unlocked condition when the switch assembly is in an operating condition. Also, the reciprocating saw may include a grip portion provided by the body and engageable by the operator's other hand. In addition, the reciprocating saw may include a pivot-limiting assembly for limiting pivoting movement of the grip relative to the body beyond a pivoted position.

62 Claims, 8 Drawing Sheets

U.S. PATENT DOCUMENTS

| | | |
|---|---|---|
| 5,778,649 A | 7/1998 | Losdahl et al. |
| 5,832,611 A | 11/1998 | Schmitz |
| 5,940,977 A | 8/1999 | Moores, Jr. |
| 6,108,916 A | 8/2000 | Zeiler et al. |
| 6,138,364 A | 10/2000 | Schmitz |
| 6,139,359 A | 10/2000 | Fuhreck et al. |
| 6,293,859 B1 | 9/2001 | Fink et al. |
| 6,439,088 B1 * | 8/2002 | Eytchison et al. ............ 30/276 |
| 2003/0002937 A1 | 1/2003 | Miura |

* cited by examiner

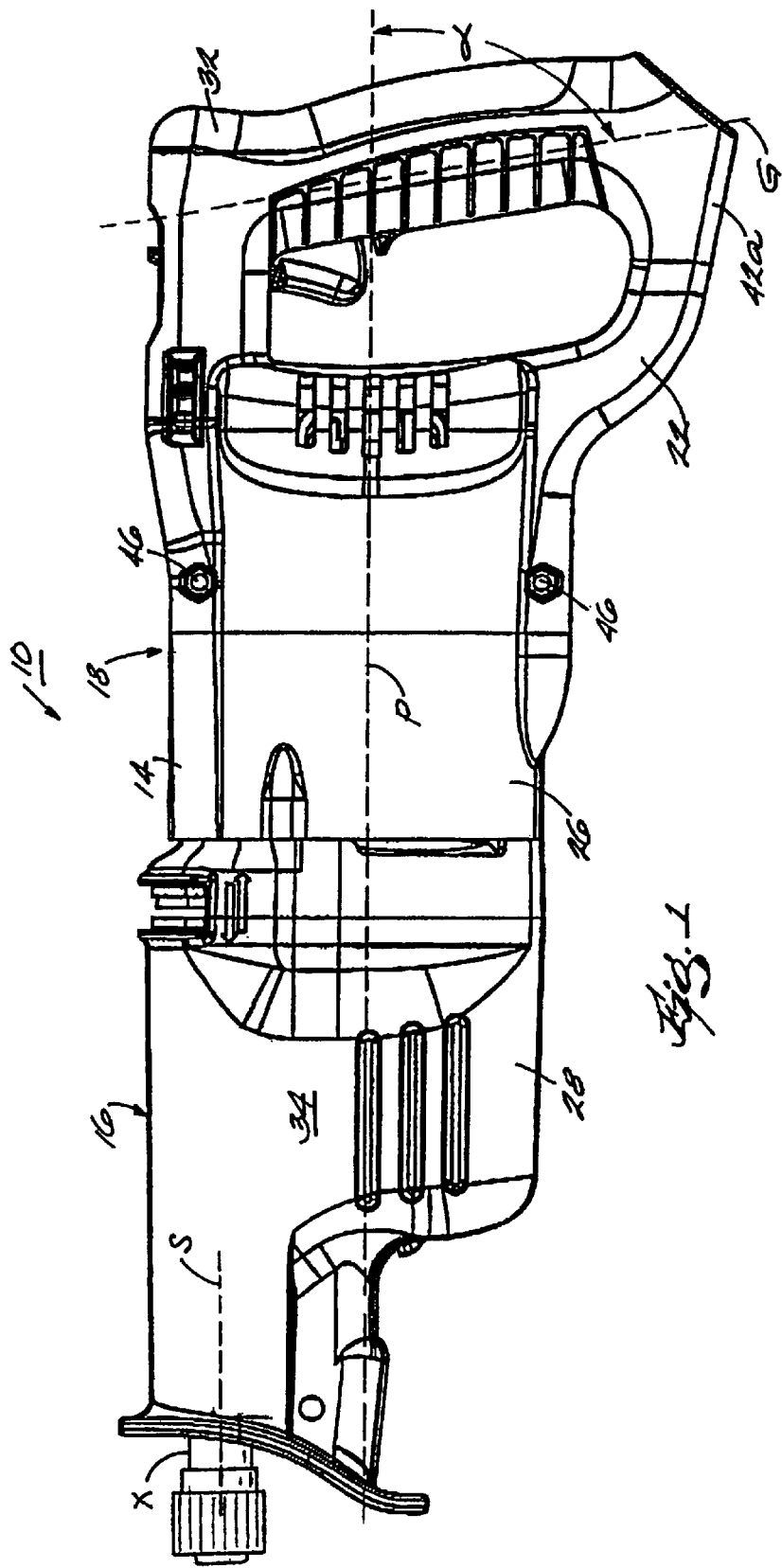

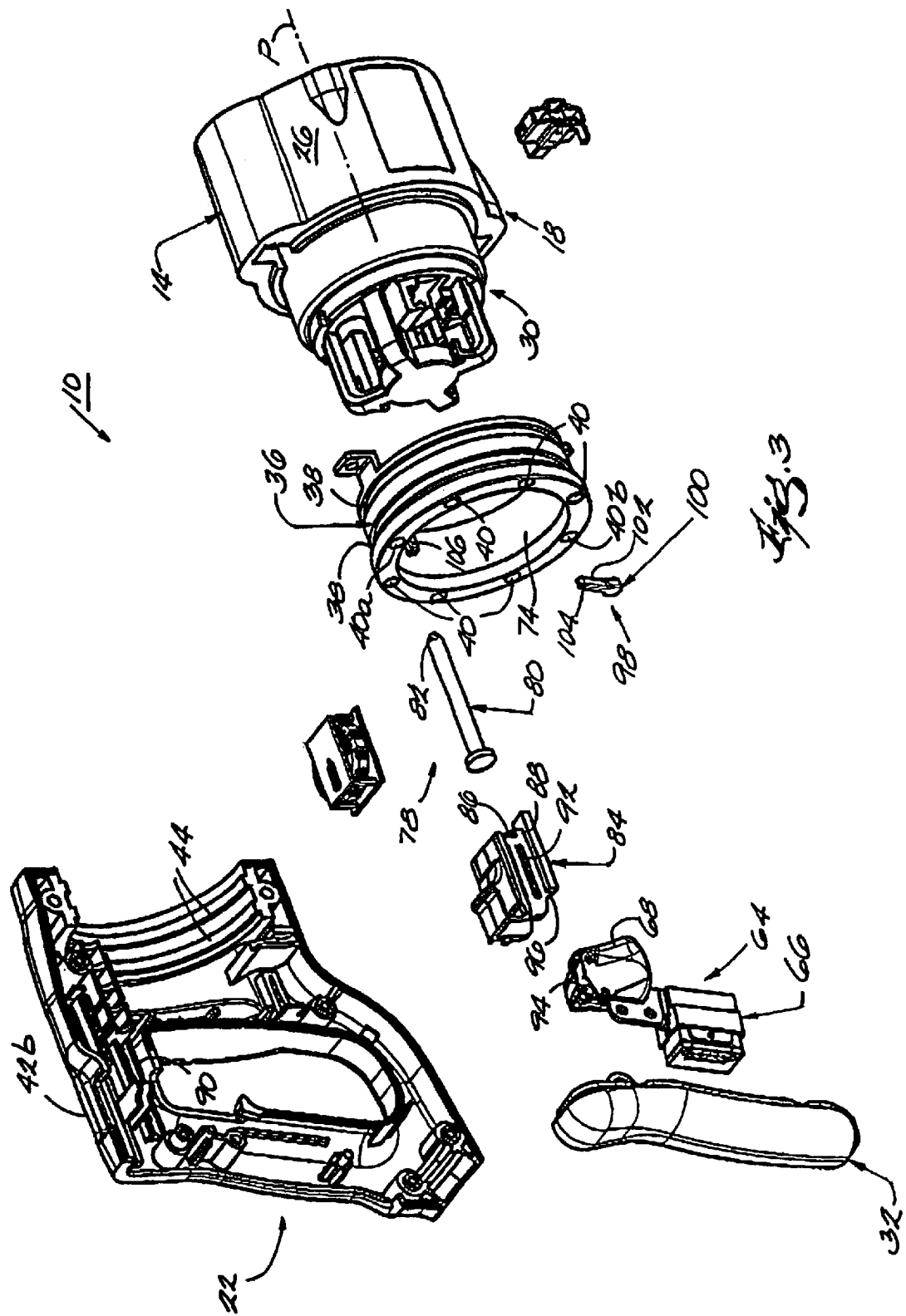

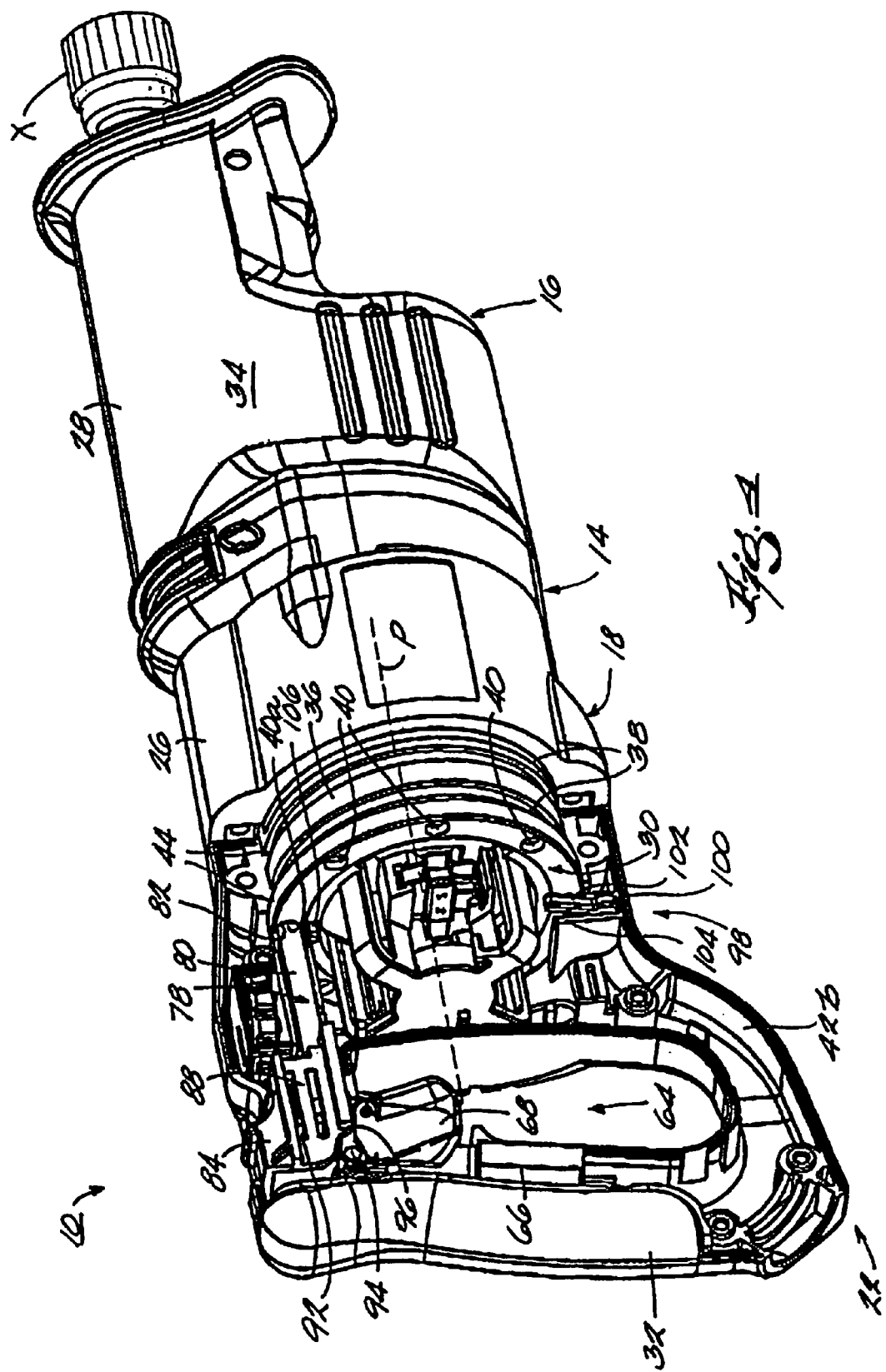

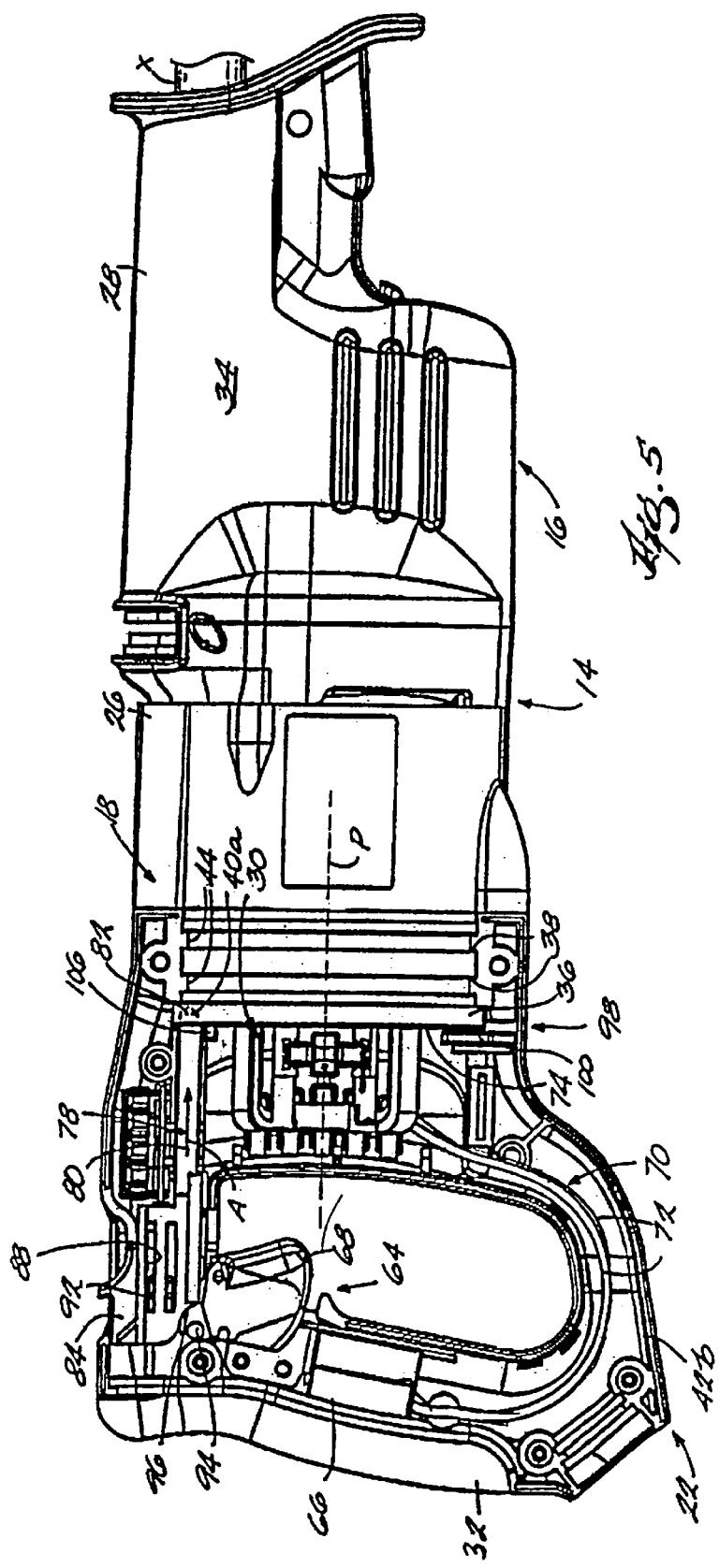

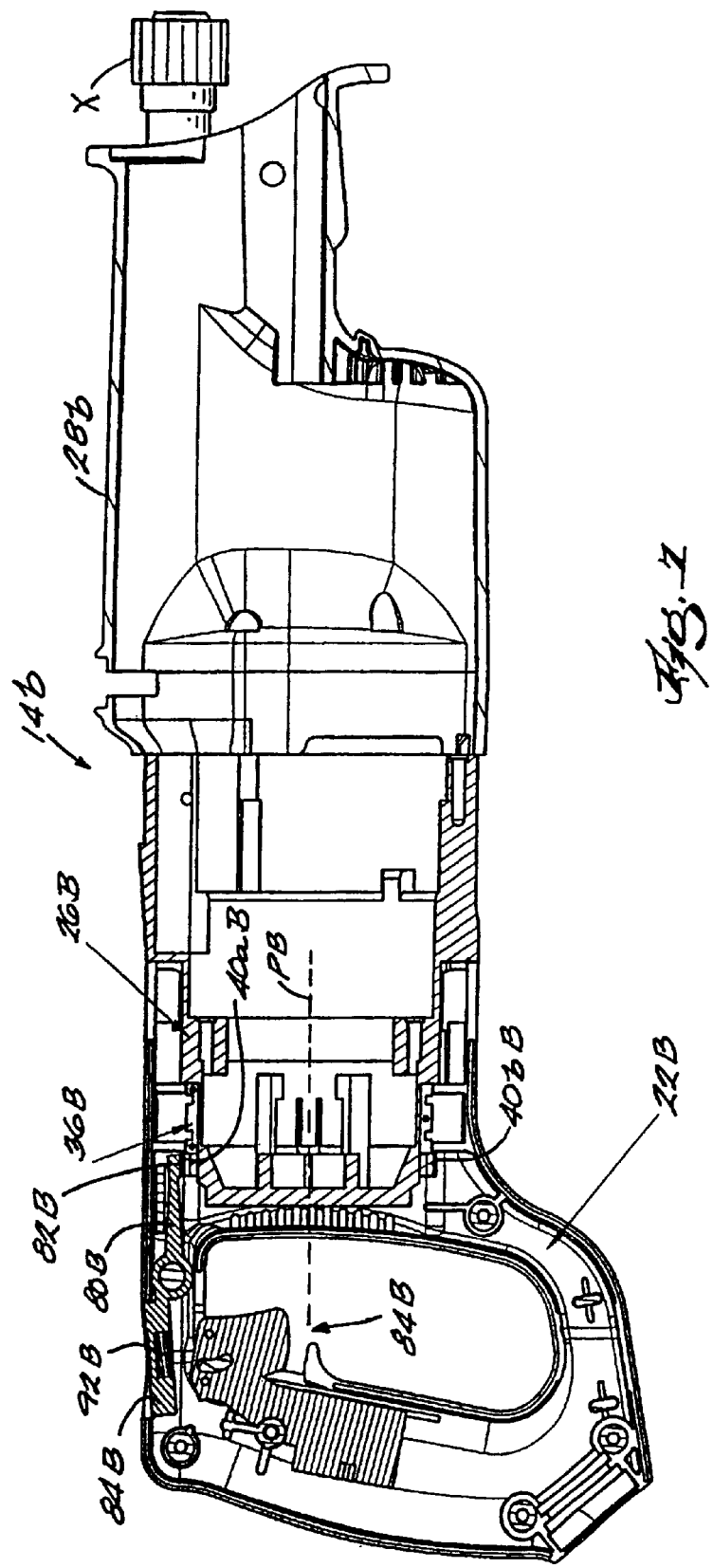

HANDLE ARRANGEMENT FOR A RECIPROCATING SAW

FIELD OF THE INVENTION

The present invention relates to power tools and, more particularly, to a handle arrangement for a power tool, such as a reciprocating saw.

BACKGROUND OF THE INVENTION

A power tool, such as a reciprocating saw, generally includes a housing supporting a motor and a drive mechanism. The motor and the drive mechanism operate to drive a spindle and a tool element supported by the spindle. In a typical reciprocating saw, a main operator's handle is integrally formed with the rearward portion of the housing. Generally, the fixed-handle reciprocating saw is gripped by the operator with one hand on the main operator's handle and a second hand on a forward portion of the housing. The main operator's handle may be a D-shaped handle.

SUMMARY OF THE INVENTION

One problem with existing power tools, such as the above-described fixed-handle reciprocating saws, is that, in some cutting operations, the operator may prefer a different handle position than the position in which the handle was formed with the housing. For example, the operator may prefer a handle orientation which can be altered for different cutting operations, for different work locations or for operator comfort. In particular, the operator may desire to pivot the handle about an axis defined by the housing so that the operator can hold the saw in a different or more comfortable manner or so that the operator can better control the saw.

Another problem with existing power tools, such as the above-described fixed-handle reciprocating saws, is that the operator may be required to operate the saw in a relatively confined area, such as for example, between obstacles or walls. In such applications, because the configuration of the saw is fixed, the operator may not be able to operate the saw effectively because of the obstacles.

The present invention provides, among other things, a handle arrangement for a power tool, such as a reciprocating saw, that alleviates one or more of the above-identified or other problems with existing power tools and reciprocating saws. Generally, in some aspects, the invention provides a reciprocating saw including a handle or grip that is pivotable about an axis defined by the body of the saw.

More particularly, the present invention provides a power tool including a spindle for supporting a tool element, a body defining a pivot axis and housing a motor and a drive mechanism driven by the motor, the drive mechanism selectively driving the spindle, the body having a forward end supporting the spindle and a rearward end, and a grip engageable by a hand of an operator, the grip being connected to the rearward end of the body for pivoting movement about the pivot axis, the grip having a first end and a second end and defining a grip axis extending between the first end and the second end, the grip axis being oriented at a non-parallel angle relative to the pivot axis.

Also, the present invention provides a reciprocating saw including a reciprocatable spindle for supporting a saw blade for reciprocating sawing movement, a body defining a pivot axis and housing a motor and a drive mechanism driven by the motor, the drive mechanism selectively driving the spindle, the body having a forward end supporting the spindle and a rearward end, and a grip engageable by a hand of an operator, the grip being connected to the rearward end of the body for pivoting movement about the pivot axis. Preferably, the pivot axis and the grip axis define an angle of between thirty degrees and ninety degrees. The grip axis may be oriented at a substantially perpendicular angle relative to the pivot axis.

In addition, the present invention provides a reciprocating saw including a reciprocatable spindle for supporting a saw blade for reciprocating sawing movement, a body defining a pivot axis and housing a motor and a drive mechanism driven by the motor, the drive mechanism selectively driving the spindle, the body having a forward end supporting the spindle and a rearward end, and a D-shaped handle engageable by a hand of an operator, the D-shaped handle being connected to the rearward end of the body for pivoting movement about the pivot axis. The handle may define a handle axis, and the handle axis is preferably oriented at a substantially perpendicular angle relative to the pivot axis.

The reciprocating saw may include a grip portion provided by the body and engageable by the other hand of the operator. Preferably, the grip portion is substantially parallel to the pivot axis. The reciprocating saw may also include a battery supported by the handle and electrically connectable to the motor to supply power to the motor.

Further, the reciprocating saw preferably includes a switch assembly operable to electrically connect the motor to a power source, and at least a portion of the switch assembly is preferably supported on the handle for pivoting movement with the handle about the pivot axis. The reciprocating saw may also include a wiring arrangement electrically connecting the switch assembly to the motor and accommodating pivoting movement of the switch assembly with the handle about the pivot axis. Also, the switch assembly is preferably inoperable during pivoting movement of the handle about the pivot axis. Preferably, the motor is inoperable during pivoting movement of the handle about the pivot axis.

Preferably, the reciprocating saw also includes a locking assembly for locking the handle in a pivoted position relative to the body. The locking assembly may include a recess defined by one of the body and the handle and a projection defined by another of the body and the handle, the projection being engageable with the recess to lock the handle in a pivoted position relative to the body. Preferably, the locking assembly includes a first recess and a second recess defined by the one of the body and the handle, and the projection is selectively engageable in the first recess to lock the handle in a first pivoted position relative to the body and in the second recess to lock the handle in a second pivoted position relative to the body.

Also, the locking assembly has a locked condition and an unlocked condition, and the switch assembly is preferably inoperable when the locking assembly is in the unlocked condition. In addition, the switch assembly has an operating condition and a non-operating condition, and, when the switch assembly is in the operating condition, the locking assembly preferably cannot be changed from the locked condition to the unlocked condition.

The reciprocating saw may also include a radial annular projection extending circumferentially around at least a portion of the circumference of one of the rearward end of the body and the handle, the other of the rearward end of the body and the handle defining a radial annular recess extending circumferentially around at least a portion of the circumference of the other of the rearward end of the body and the handle. The annular projection is preferably engaged with and travels in the annular groove during pivoting movement of the handle about the pivot axis.

Preferably, the reciprocating saw also includes a pivot-limiting assembly for limiting pivoting movement of the handle relative to the body from a first pivoted position beyond a second pivoted position. The pivot-limiting assembly preferably includes a first pivot-limiting member supported by one of the handle and the body and a second pivot-limiting member defined by the other of the handle and the body, the first pivot-limiting member being engageable with the second pivot-limiting member to prevent movement of the handle relative to the body beyond the second pivoted position. Preferably, the pivot-limiting assembly prevents pivoting movement of the handle relative to the body, in a first direction, from the first pivoted position beyond the second pivoted position and, in a second direction opposite to the first direction, from the first pivoted position beyond the second pivoted position.

The first pivot-limiting member preferably has a first surface engageable with the second pivot-limiting member during pivoting movement in a first direction and a second surface engageable with the second pivot-limiting member during pivoting movement in a second direction. Preferably, the first pivot-limiting member is movable between a first limit position, in which the second pivoted position is defined by engagement of the first pivot-limiting member and the second pivot-limiting member, and a second limit position in which the second pivoted position is defined by engagement of the first pivot-limiting member and the second pivot-limiting member. Preferably, the first pivot-limit member is pivotable between the first limit position and the second limit position about an axis substantially parallel to the pivot axis.

Further, the present invention provides a reciprocating saw including a reciprocatable spindle for supporting a saw blade for reciprocating sawing movement, a body defining a pivot axis and housing a motor and a drive mechanism driven by the motor, the drive mechanism selectively driving the spindle, the body having a forward end supporting the spindle and a rearward end, and a grip engageable by a hand of an operator, the grip being connected to the rearward end of the body for pivoting movement about the pivot axis, a radial annular projection extending circumferentially around at least a portion of the circumference of one of the rearward end of the body and the grip, another of the rearward end of the body and the grip defining a radial annular groove extending circumferentially around at least a portion of the circumference of the other of the rearward end of the body and the grip, the annular projection being engaged with and travelling in the annular groove during pivoting movement of the grip about the pivot axis.

One independent advantage of the present invention is that the grip is pivotable relative to the body to enable the operator to position the grip in the most comfortable position for operation of the saw.

Another independent advantage of the present invention is that the grip is adjustable to a position which enables the operator to operate the saw in a relatively confined area. In such applications, because the configuration of the saw is not fixed, the operator is able to configure the saw to avoid obstacles and to operate the saw effectively in the confined work area.

Other independent features and independent advantages of the present invention will become apparent to those skilled in the art upon review of the following detailed description, claims, and drawings.

BRIEF DESCRIPTION OF THE DRAWINGS

The present invention is further described with reference to the accompanying drawings, which show a preferred embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention. Also, it is understood that the phraseology and terminology used herein is for the purpose of description and should not be regarded as limiting.

In the drawings, wherein like reference numerals indicate like parts:

FIG. 1 is a side view of a power tool, such as a reciprocating saw, including a handle arrangement embodying the invention;

FIG. 3 is an exploded perspective view of a portion of the reciprocating saw shown in FIG. 1;

FIG. 4 is a perspective view of the reciprocating saw shown in FIG. 1 with one handle half removed;

FIG. 5 is a side view of the reciprocating saw shown in FIG. 1 with one handle half removed;

FIG. 7 is a partial cross-sectional side view of an alternative construction of a locking assembly for a reciprocating saw.

DETAILED DESCRIPTION OF THE PREFERRED EMBODIMENT

Figure 2A:
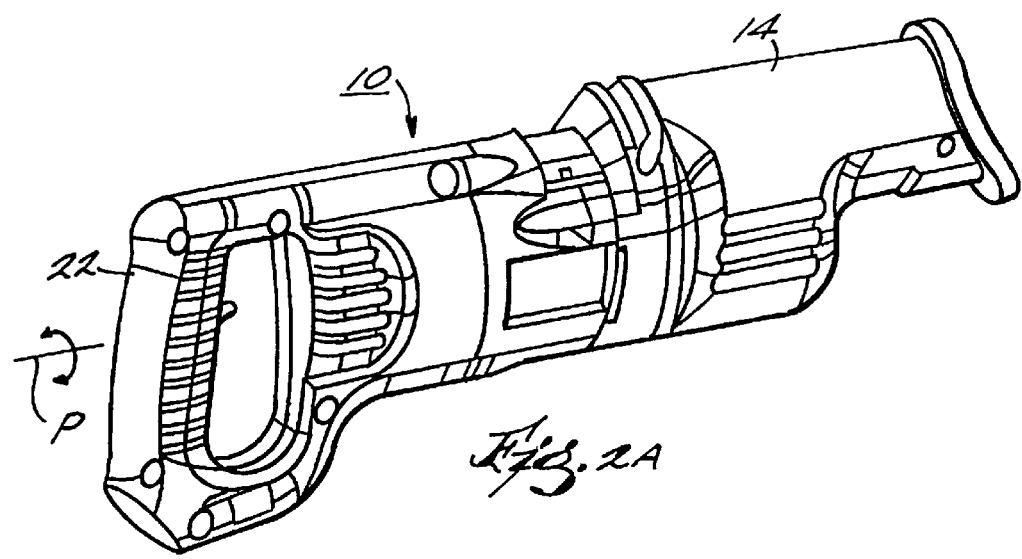
FIGS. 2A–2D illustrate the adjustment of the handle arrangement.

A power tool, such as a reciprocating saw 10, embodying the invention is illustrated in FIGS. 1–2. The reciprocating saw 10 includes a body 14 having a forward end 16 and a rearward end 18 and a main operator's handle or hand grip 22 pivotably connected to the rearward end 18 of the body 14.

Figure 2B:
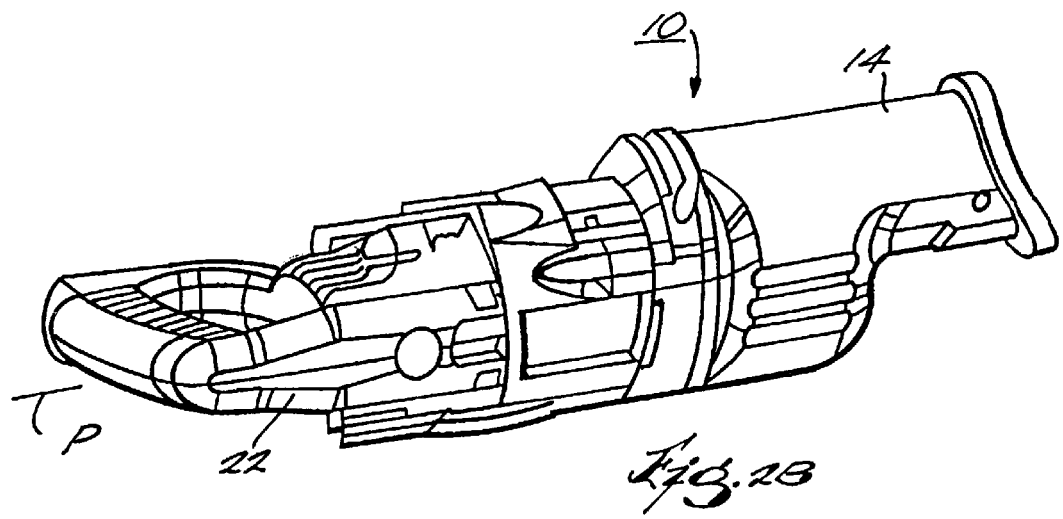
Figure 2C:
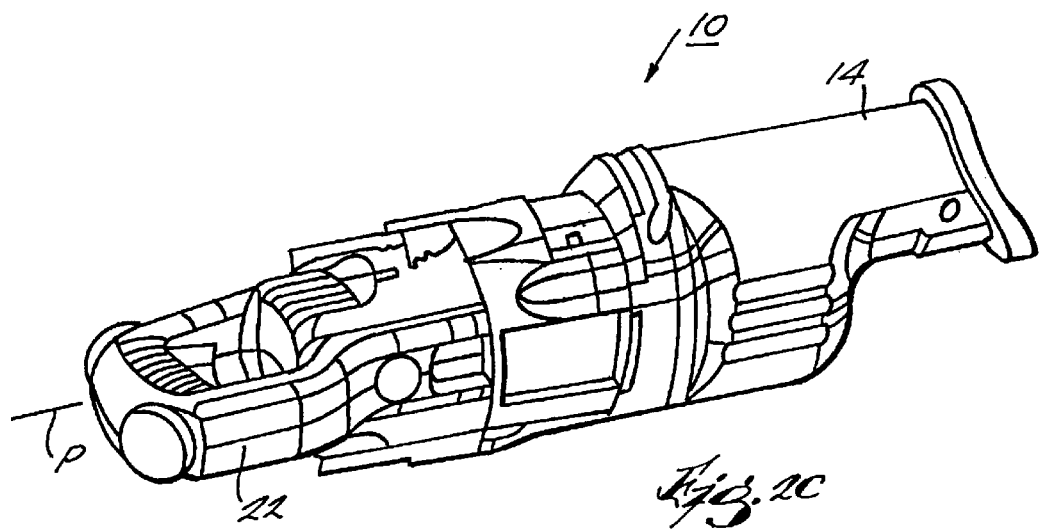
Figure 2D:
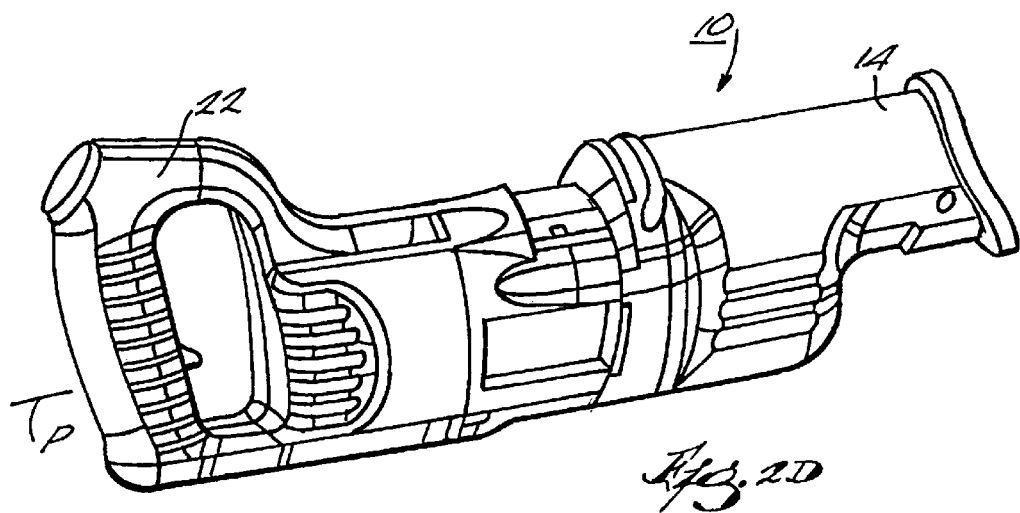

The body 14 defines a pivot axis P, and the grip 22 is pivotable about the pivot axis P between the positions shown in FIGS. 2A–2D. FIG. 2A illustrates a neutral or normal operating position for the reciprocating saw 10. FIGS. 2B and 2C illustrate 90° pivoted positions, in a first (i.e., clockwise) direction and in a second (i.e., counterclockwise) direction, respectively. FIG. 2D illustrates a 180° pivoted or inverted position of the grip 22 relative to the body 14. The grip 22 is adjustable to the inverted position in both directions from the neutral position. As explained below in more detail, the grip 22 is prevented from pivoting in both directions beyond the inverted position. It should be understood that the grip 22 is positionable in pivoted positions between the four illustrated pivoted positions.

The body 14 is provided by a housing assembly including a motor housing 26 and a gear case 28. In the motor housing 26, the body 14 houses a motor 30 (partially shown in FIGS. 3–5), and, in the gear case 28, the body 14 houses a drive mechanism (not shown) drivingly connected to the motor 30. While in the illustrated construction, the body 14 houses both the motor 30 and the drive mechanism, in other constructions (not shown) and in some aspects of the invention, the body 14 houses only one or at least one of the motor 30 and the drive mechanism. The motor 30 and the drive mechanism are operable to reciprocate a spindle (not shown) generally along a spindle axis S (shown in FIG. 1). In the illustrated construction, the spindle is supported by the forward end of the body 16 for reciprocating motion and may be supported for rocking motion or orbital motion relative to the body 14. In the illustrated reciprocating saw 10, the spindle is adapted to support a saw blade (not shown) for cutting a workpiece (not shown) in a cutting plane defined by the saw blade.

As shown in FIGS. 1–5, the grip 22 is pivotably connected to the rearward end 18 of the body 14 for pivotal movement about the pivot axis P. In the illustrated construction, the grip 22 is a D-shaped handle adapted to be gripped relatively comfortably and securely by one of the operator's hands. In the illustrated construction, a cushion grip 32 is integrally formed on the grip 22, preferably making the grip 22 relatively more comfortable for the operator to hold. In other constructions (not shown), the grip 22 may have a different shape and configuration. For example, the grip 22 may have a pistol-type shape.

The grip 22 has (see FIG. 1) a first end and a second end and defines a grip axis G therebetween. The grip axis G and the pivot axis P define an angle α, which is preferably between 30° and 90°. In the illustrated construction, the grip axis G is substantially perpendicular to the pivot axis P (i.e., the angle α is about 80°). It should be understood that, in other constructions (not shown) and in some aspects of the invention, the orientation of the axes G and P may be different, such as generally parallel or skew. As shown in FIGS. 2A–2D, the grip 22 is pivotably adjustable between pivoted positions (see FIGS. 2A and 2D) in which the grip axis G is generally co-planar with the cutting plane and pivoted positions (see FIGS. 2B and 2C) in which the grip axis G is non-planar with the cutting plane.

As shown in FIGS. 1–2 and 4–5, the body 14 provides a generally cylindrical forward grip portion 34. The grip portion 34 is located on the forward end 16 of the body 14 and is configured to be held by the operator's other hand in any number of different manners and orientations relative to the body 14. In operation, the operator preferably places one hand on the grip 22 and the other hand on the grip portion 34 to guide and support the reciprocating saw 10 as the reciprocating saw 10 cuts the workpiece.

As shown in FIGS. 3–5, an inner ring 36 is connected to the rearward end 18 of the body 14 by fasteners (not shown). The inner ring 36 defines at least one and, preferably, two radially-inwardly extending circumferential grooves 38. In the illustrated construction, the grooves 38 extend about the circumference of the inner ring 36. In other constructions (not shown), grooves may extend about only a portion of the circumference of the inner ring 36. On the rearward face, the inner ring 36 defines (see FIGS. 3–4) a plurality of axially-extending, circumferentially-spaced apart recesses 40. It should be understood that, in other constructions (not shown), the inner ring 36 may not be provided, and the structures formed on the inner ring (i.e., the grooves 38 and the recesses 40) may be defined by the rearward end 18 of the body 14.

The grip 22 is formed of two handle halves 42a (shown in FIG. 1) and 42b (shown in FIGS. 3–5). The handle halves 42a and 42b are mirror images, and, therefore, only the handle half 42b will be described in detail. The handle half 42b defines at least one and, preferably, two radially-inwardly extending circumferential projections 44. In the illustrated construction, the projections 44 extend about the circumference of the handle half 42b. In other constructions (not shown), projections may extend about only a portion of the circumference of the handle half 42b.

The handle halves 42a and 42b sandwich the inner ring 36 and the rearward end 18 of the body 14. The projections 44 are complementary to and engageable with the grooves 38 when the handle halves 42a and 42b are positioned on the inner ring 36 and the rearward end 18 of the body 14. As shown in FIG. 1, fasteners 46 hold the handle halves 42a and 42b in contact with the rearward end 18 of the body 14. In this manner, the grip 22 is axially fixed with but pivotably movable relative to the body 14 about the pivot axis P.

It should be understood that, in other constructions (not shown), grooves (similar to the grooves 38) may be formed on the handle halves 42a and 42b, and projections (similar to the projections 44) may be formed on the inner ring 36 or on the rearward end 18 of the body 14. Also, it should be understood that, in other constructions (such as that shown in FIG. 6), another physical connecting arrangement may be provided to maintain the grip 22 and body 14 in engagement.

Figure 6:
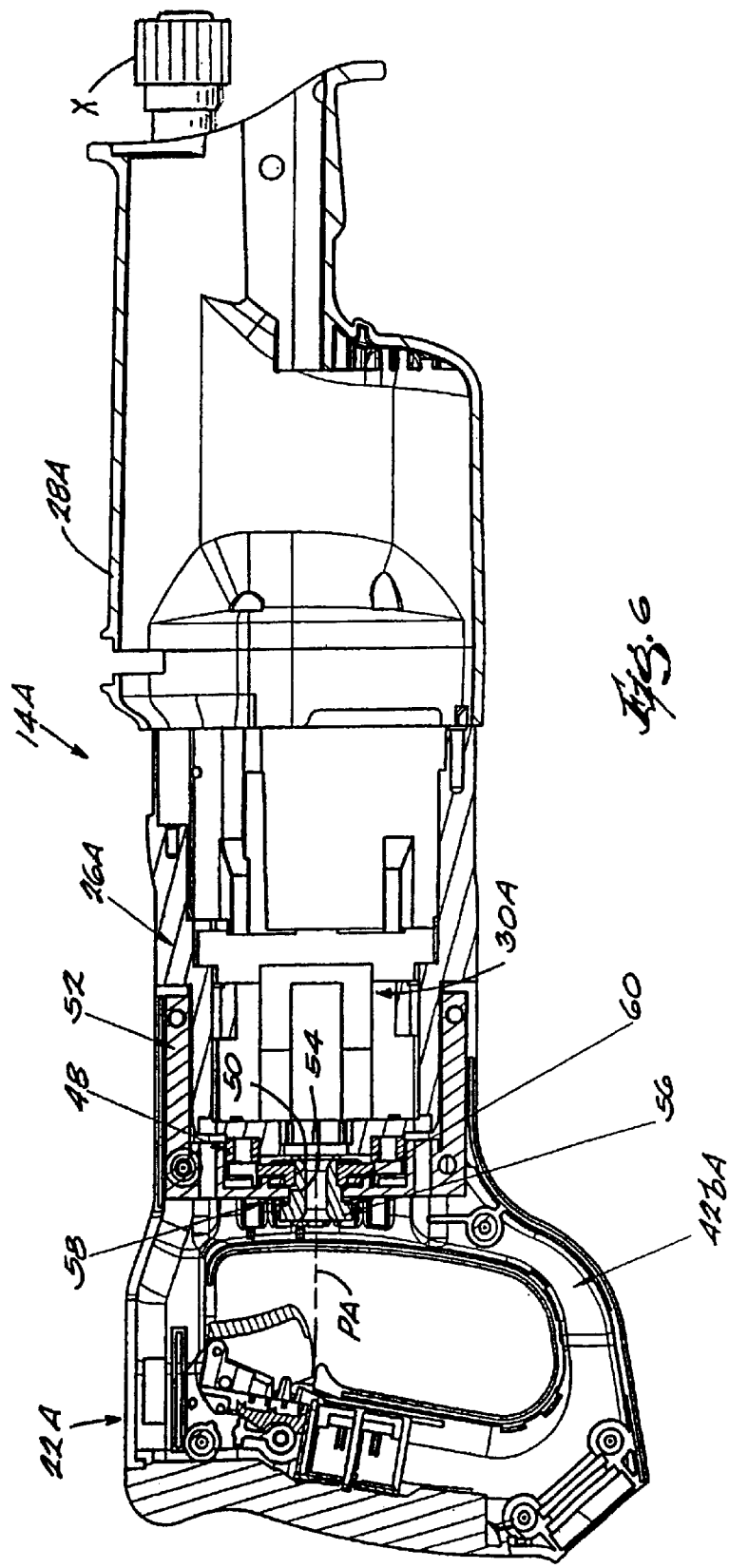
FIG. 6 is a partial cross-sectional side view of an alternative construction of a physical connecting arrangement for a reciprocating saw.

An alternate construction of a physical connecting arrangement for a reciprocating saw 10A is illustrated in FIG. 6. Common elements are identified by the same reference number "A".

As shown in FIG. 6, an inner member 48 defining an opening 50 is connected to the body 14A. An outer member 52 defining an opening 54 is connected to the grip 22A, and, when the grip 22A is sandwiches the body 14A, the openings 50 and 54 are generally aligned with one another and with the pivot axis PA. An axially-extending connecting member, such as, for example, a bolt 56 extends through the openings 50 and 54 to axially fix the grip 22A and the body 14A. The bolt 56 allows pivotable movement of the grip 22A relative to the body 14A. One or more biasing members, such as, for example, a spring washer 58 biases or compresses the grip 22A and the body 14A into close axial engagement. A bearing member, such as a thrust washer 60, allows relative rotation of the grip 22A and the body 14A. In this manner, the grip 22A is axially fixed with but pivotably movable relative to the body 14A about the pivot axis PA.

Referring to the first construction (as shown in FIGS. 3–5), the motor 30 is an electric motor that is connectable to a power source (not shown), for example, to a separate AC or DC power source by a plug (not shown but connectable to the second end of the grip 22) or to a battery (not shown) supported on the grip 22 or on the body 14. An electrical circuit is operable to connect the motor 30 to the power source. The circuit includes (see FIGS. 3–5) a switch assembly 64 which selectively connects the motor 30 to the power source. In an operating condition, the switch assembly 64 connects the motor 30 to the power source. In a non-operating condition, the switch assembly 64 does not connect the motor 30 to the power source.

The switch assembly 64 includes an on/off switch 66 and a trigger 68. As shown in FIGS. 4–5, at least a portion of the switch assembly 64 (i.e., the on/off switch 66 and the trigger 68) is supported on the grip 22 and is pivotable with the grip 22 about the pivot axis P.

To accommodate pivoting movement of the on/off switch 66 with the grip 22 about the pivot axis P and relative to the motor 30, the reciprocating saw 10 includes a connecting structure, such as a wiring arrangement 70 (partially shown in FIG. 5). The wiring arrangement 70 preferably includes wires, leads, contacts, etc., which electrically connect the pivotably movable elements of the switch assembly 64, such as the on/off switch 66 and/or the trigger 68, to the motor 30.

In the illustrated construction, the wiring arrangement 70 also connects and accommodates pivoting movement of the power source (i.e., a separate source through the plug or a battery supported on the grip 22) relative to the motor 30.

In the illustrated construction, the wiring arrangement 70 includes wires 72 having a sufficient length and arranged in a manner within the reciprocating saw 10 to accommodate movement of the on/off switch 66 with the grip 22 about the pivot axis P and relative to the motor 30. The wires 72 extend from the on/off switch 66 to a portion of the motor 30 extending through (see FIG. 3) a central opening 74 in the inner ring 36 and are connected to the motor 30 with electrical connectors (not shown), such as leads. The opening 74 is generally aligned with the pivot axis P, and the electrical connections are made relatively near the pivot axis P so that, during pivoting movement of the grip 22, the distance between the on/off switch 66 and the motor 30 remains generally constant.

It should be understood that, in other constructions (not shown), different connecting structure may be provided to electrically connect the on/off switch 66 and the motor 30 and to accommodate pivoting movement of the on/off switch 66 relative to the motor 30.

For example, a fixed electrical connector (not shown) may be provided on one of the grip 22 and the body 14 (i.e., on the body 14) and is connected to the associated one of the on/off switch 66 and the motor 30 (i.e., to the motor 30). The fixed electrical connector extends along the path of movement of the grip 22 relative to the body 18. A movable electrical connector (not shown) is provided on the other of the grip 22 and the body 14 (i.e., on the grip 22) and is connected to the associated one of the on/off switch 66 and the motor 30 (i.e., to the on/off switch 66). The movable electrical connector moves along and maintains electrical connection with the fixed electrical connector during pivoting movement of the on/off switch 66 with the grip 22 relative to the motor 30 to maintain the electrical connection between the on/off switch 66 and the motor 30.

In yet another construction (not shown), the connecting structure may include a remote transmitter and sensor combination to connect the on/off switch 66 to the motor 30. In such a construction, the transmitter is fixed to and moves with the grip 22. The transmitter transmits a signal based on the condition of the on/off switch 66, for example, an "ON" signal or an "OFF" signal. The sensor or receiver is mounted on the body 14 and electrically connected to the motor 30. The sensor senses the transmitted signal and, if, for example, the "ON" signal is transmitted, connects the motor 30 to the power source. In this construction, the power source is directly connectable to the motor 30, rather than being connected to the motor 30 through the switch assembly 64.

The reciprocating saw 10 also includes (see FIGS. 3–5) a locking assembly 78 for locking the grip 22 in a pivoted position relative to the body 14. As explained in more detail below, the locking assembly 78 is operable between a locked condition, in which the grip 22 is fixed in a pivoted position relative to the body 14, and an unlocked condition, in which the grip 22 is pivotable about the pivot axis P relative to the body 14.

In the illustrated construction, the locking assembly 78 includes a detent arrangement between the grip 22 and the body 14 to provide a positive locking engagement between the grip 22 and the body 14. The locking assembly 78 includes a first locking member or a locking pin 80 having a tapered locking projection 82. The locking projection 82 is selectively engageable in a second locking member (provided by one of the recesses 40 in the rearward face of the inner ring 36) to lock the grip 22 in a pivoted position relative to the body 14. The recesses 40 are tapered and are sized to receive the locking projection 82. The corresponding taper of the locking projection 82 and the recesses 40 substantially eliminates any unintended pivotal motion of the grip 22 about the pivot axis P relative to the body 14 caused by manufacturing tolerances in either the locking pin 80 or the recesses 40.

The locking projection 82 is engageable in a first recess 40a to lock the grip 22 in a first pivoted position relative to the body 14 (i.e., the neutral position shown in FIG. 2A) and in a second recess 40b to lock the grip 22 in a second pivoted position relative to the body 14 (i.e., the inverted position shown in FIG. 2D). The locking projection 82 is engageable in one of the other recesses 40 to lock the grip 22 in a corresponding pivoted position relative to the body 14. In the illustrated construction, the recesses 40 are spaced apart 45° about the circumference of rearward face of the inner ring 36 and provide corresponding 45° spaced apart locked pivoted positions of the grip 22 relative to the body 14.

The locking assembly 78 also includes (see FIGS. 3–5) an actuator 84 to move the locking pin 80 from the locked position (shown in FIGS. 4–5 and in the direction of arrow A in FIG. 5) to the unlocked position (not shown but in the direction opposite to arrow A). In the illustrated construction, the locking pin 80 is slidable along an axis generally parallel to the pivot axis between the locked position and the unlocked position. The actuator 84 defines an opening 86 in which the locking pin 80 is supported, and (see FIG. 3) axial grooves 88 defined on the actuator 84 cooperate with axial projections 90 on the handle halves 42a and 42b to guide the actuator 84 during movement between the locked position and the unlocked position. A biasing member, such as a spring 92, biases the actuator 84 in the direction of arrow A and, thereby, biases the locking member 80 to the locked position. The locking assembly 78 is thus biased to the locked condition.

To move the grip 22 relative to the body 14, the actuator 84 is operated (moved in the direction opposite to arrow A) to move the locking projection 82 out of engagement with the selected recess 40. While holding the actuator 84, the grip 22 is then moved relative to the body 14 to a position corresponding to engagement of the locking projection 82 with another one of the recesses 40. When the grip 22 is in the desired position, the actuator 84 is released, and the locking projection 82 is moved by the spring 92 into the selected recess 40 to lock the grip 22 in the selected pivoted position relative to the body 14.

It should be understood that, in other constructions (such as that shown in FIG. 7), the components of the locking assembly 78 may move in a different manner, such as, for example, radially (shown in FIG. 7), tangentially, circumferentially, etc., or may move in a different manner, such as, for example, pivotable (shown in FIG. 7), rotatable, radially slidable, etc., between the locked condition and the unlocked condition of the locking assembly 78.

Also, in other constructions (not shown), the locking assembly 78 may include a different locking arrangement, such as a frictional engagement between the grip 22 and the body 14. In such a construction, the locking assembly 78 may be provided by the handle halves 42a and 42b (or similar structure) releasably applying a clamping force to the body 14. An actuating member, such as the fasteners which connect the handle halves 42a and 42b, selectively move the clamping members between a locked position and an unlocked position corresponding to the locked condition and the unlocked condition, respectively, of the locking assembly 78. In such a construction, the locking assembly 78 may also include a positive engagement arrangement, such as inter-engaging teeth formed on the body 14 and the grip 22 which are engaged when the clamping force is applied.

An alternative construction of a locking assembly 78B for a reciprocating saw 10B is illustrated in FIG. 7. Common elements are identified by the same reference number "B".

As shown in FIG. 7, the first locking member and the locking projection 82B are provided on the forward end of the actuator 84B. The locking projection 82B is selectively engageable in one of the recesses 40B (which are defined on the rearward end of the inner ring 36B and which extend radially-inwardly) to lock the grip 22B in a pivoted position relative to the body 14B. The actuator 84B is pivotable to move the locking projection 82B into and out of engagement with the recesses 40B (between the locked position and the unlocked position, respectively). The spring 92B biases the actuator 84B and, thereby, biases the locking projection 82B to the locked position (in engagement with one of the recesses 40B).

Referring to the first construction, the reciprocating saw 10 also includes (see FIGS. 3–5) structure to prevent the switch assembly 64 from connecting the motor 18 to the power source when the locking assembly 78 is in the unlocked condition. Further, the reciprocating saw 10 includes structure to prevent the locking assembly 78 from being operated from the locked condition to the unlocked condition when the switch assembly 64 is in the operated condition. The locking assembly 78 and the switch assembly 64 interact to prevent unintentional operation of one assembly when the other assembly is being operated.

The trigger 68 and the actuator 84 include respective blocking portions 94 and 96. When the switch assembly 64 is in the operating condition, the trigger 68 is pivoted so that the blocking portion 94 on the trigger 68 extends into the path of the actuator 84 and prevents the actuator 84 from moving rearwardly to move the locking pin 80 to the unlocked position. The position of the blocking portion 94 when the switch assembly 64 is in the operating condition thus prevents the locking assembly 78 from being changed to the unlocked condition.

Similarly, when the locking assembly 78 is in the unlocked condition, the actuator 84 is moved rearwardly so that the blocking portion 96 on the actuator 84 extends into the path of the trigger 68 and prevents the trigger 68 from pivoting to a position corresponding to the "ON" position of the on/off switch 66 (and to the operating condition of the switch assembly 64). The position of the blocking portion 96 when the locking assembly 68 is in the unlocked condition thus prevents the switch assembly 64 from being changed to the operating condition from the non-operating condition. Therefore, the switch assembly 64 (and the motor 30) is inoperable when the locking assembly 78 is in the unlocked condition.

It should be understood that, in other constructions (such as that shown in FIG. 7), the blocking or preventing structure could operate in a different manner. Also, different structures could be provided to prevent operation of one of the assemblies 64 or 78 when the other assembly is being operated.

As shown in FIGS. 2A–2D, the grip 22 is pivotable approximately 360° about the pivot axis P. However, the grip 22 cannot be pivoted more than 360° to prevent, among other things, the wires 72 from being entangled or over extended. To prevent such over-pivoting of the grip 22, the reciprocating saw 10 includes (see FIGS. 3–5) a pivot-limiting assembly 98 for limiting pivoting movement of the grip 22 relative to the body 14 from a first pivoted position beyond a second pivoted position.

In the illustrated construction, the pivot-limiting assembly 98 limits pivoting movement of the grip 22 relative to the body 14 from the inverted position (shown in FIG. 2D), around 360° and beyond the inverted position. In other words, in the illustrated construction, the grip 22 is pivotable to the inverted position (shown in FIG. 2D) in either direction but not beyond the inverted position.

The pivot-limiting assembly 98 includes (see FIGS. 3–5) a first pivot-limiting member or rotation stop cam 100 supported by the grip 22 for slight pivoting movement. The stop cam 100 has spaced apart stop surfaces 102 and 104. The stop cam 100 is engageable with a second pivot-limiting member or stop tab 106 defined on the inner ring 36 to prevent movement of the grip 22 relative to the body 14 beyond the inverted position in either direction.

When the grip 22 is pivoted in a first direction (i.e., from the position shown in FIG. 2B to the inverted position shown in FIG. 2D), the stop cam 100 pivots slightly in the same direction to a first pivot-limit position upon engagement of the stop tab 106 with the first stop surface 102. This pivoting movement of the stop cam 100 allows the grip 22 to pivot to the inverted position in the first direction.

When the grip 22 is pivoted in a second direction opposite to the first direction (i.e., from the position shown in FIG. 2C to the inverted position shown in FIG. 2D), the stop cam 100 pivots slightly in the same direction to a second pivot-limit position upon engagement of the stop tab 106 with the second stop surface 104. This pivoting movement of the stop cam 100 allows the grip 22 to pivot to the inverted position in the second direction.

It should be understood that, in other constructions (not shown), the pivot-limiting assembly 98 may limit pivoting movement beyond another pivoted position. Also, in other constructions (not shown), the pivot-limiting assembly 98 may limit pivoting movement of the grip 22 to less than 360° or to a limit greater than 360°. In addition, in other constructions (not shown), the pivot-limiting assembly 98 may include other components and/or the components may interact in other ways to prevent pivoting movement of the grip 22 beyond the desired pivot limits.

The embodiments described above and illustrated in the drawings are presented by way of example only and are not intended as a limitation upon the concepts and principles of the present invention. As such, it will be appreciated by one having ordinary skill in the art, that various changes in the elements and their configuration and arrangement are possible without departing from the spirit and scope of the present invention as set forth in the appended claims.

What is claimed is:

1. A power tool comprising:
   a spindle for supporting a tool element;
   a body defining a longitudinal pivot axis and housing a motor and a drive mechanism driven by the motor, the drive mechanism selectively driving the spindle, the body having a forward end supporting the spindle and a rearward end; and
   a grip engageable by a hand of an operator, the grip being connected to the rearward end of the body for pivoting movement relative to the body about the pivot axis, the grip having a first end and a second end and defining a grip axis extending between the first end and the second end, the grip axis being oriented at an angle of between thirty degrees and ninety degrees relative to the pivot axis, wherein the power tool is a reciprocating saw.

2. The power tool of claim 1, wherein the grip axis is oriented at a substantially perpendicular angle relative to the pivot axis.

3. The power tool as claimed in claim 1, further comprising a battery supported by the grip, the battery being electrically connectable to the motor to supply power to the motor.

4. The power tool as claimed in claim 1, further comprising a locking assembly for locking the grip in a pivoted position relative to the body.

5. The power tool as claimed in claim 4, wherein the locking assembly includes a recess defined by one of the body and the grip and a projection defined by an other of the body and the grip, the projection being engageable in the recess to lock the grip in a pivoted position relative to the body.

6. The power tool as claimed in claim 5, wherein the locking assembly includes a first recess and a second recess defined by the one of the body and the grip, and wherein the projection is selectively engageable in the first recess to lock the grip in a first pivoted position relative to the body and in the second recess to lock the grip in a second pivoted position relative to the body.

7. The power tool as claimed in claim 1, wherein the grip is a D-shaped handle.

8. The power tool as claimed in claim 1, further comprising a switch assembly operable to electrically connect the motor to a power source, at least a portion of the switch assembly being supported on the grip for pivoting movement about the pivot axis with the grip.

9. The power tool as claimed in claim 8, further comprising a wiring arrangement electrically connecting the switch assembly to the motor and accommodating pivoting movement of the switch assembly with the grip about the pivot axis and relative to the motor.

10. The power tool as claimed in claim 8, further comprising a locking assembly for locking the grip in a pivoted position relative to the body, the locking assembly having a locked condition and an unlocked condition, and wherein the switch assembly is inoperable when the locking assembly is in the unlocked condition.

11. The power tool as claimed in claim 8, wherein the switch assembly has an operating condition and a non-operating condition, wherein the power tool further comprises a locking assembly for locking the grip in a pivoted position relative to the body, the locking assembly having a locked condition and an unlocked condition, and wherein, when the switch assembly is in the operating condition, the locking assembly cannot be changed from the locked condition to the unlocked condition.

12. The power tool as claimed in claim 8, wherein the switch assembly is inoperable during pivoting movement of the grip about the pivot axis.

13. The power tool as claimed in claim 1, wherein the motor is inoperable during pivoting movement of the grip about the pivot axis.

14. The power tool as claimed in claim 1, further comprising a grip portion provided by the body and engageable by an other hand of the operator, the grip portion being substantially parallel to the pivot axis.

15. The power tool as claimed in claim 1, wherein a radial annular projection extends circumferentially around at least a portion of a circumference of one of the rearward end of the body and the grip, wherein another of the rearward end of the body and the grip define a radial annular groove extending circumferentially around at least a portion of a circumference of the other of the rearward end of the body and the grip, the annular projection being engaged with and travelling in the annular groove during pivoting movement of the grip about the pivot axis.

16. The power tool as claimed in claim 1, further comprising a pivot-limiting assembly for limiting pivoting movement of the grip relative to the body from a first pivoted position beyond a second pivoted position.

17. A reciprocating saw comprising:
   a reciprocatable spindle for supporting a saw blade for reciprocating sawing movement;
   a body defining a pivot axis and housing a motor and a drive mechanism driven by the motor, the drive mechanism selectively driving the spindle, the body having a forward end supporting the spindle and a rearward end; and, the pivot axis extending between the forward and the rearward end.
   a grip engageable by a hand of an operator, the grip being connected to the rearward end of the body for pivoting movement relative to the body about the pivot axis.

18. The reciprocating saw of claim 17, wherein the grip has a first end and a second end and defines a grip axis extending between the first end and the second end, and wherein the grip axis is oriented at a non-parallel angle relative to the pivot axis.

19. The reciprocating saw of claim 18, wherein the pivot axis and the grip axis define an angle of between thirty degrees and ninety degrees.

20. The reciprocating saw of claim 18, wherein the grip axis is oriented at a substantially perpendicular angle relative to the pivot axis.

21. The reciprocating saw as claimed in claim 17, further comprising a battery supported by the grip, the battery being electrically connectable to the motor to supply power to the motor.

22. The reciprocating saw as claimed in claim 17, further comprising a locking assembly for locking the grip in a pivoted position relative to the body.

23. The reciprocating saw as claimed in claim 17, wherein the grip is a D-shaped handle.

24. The reciprocating saw as claimed in claim 17, further comprising:
   a switch assembly operable to electrically connect the motor to a power source, at least a portion of the switch assembly being supported on the grip for pivoting movement about the pivot axis with the grip; and
   a locking assembly for locking the grip in a pivoted position relative to the body, the locking assembly having a locked condition and an unlocked condition, and wherein the switch is inoperable when the locking assembly is in the unlocked condition.

25. The reciprocating saw as claimed in claim 24, wherein the switch assembly has an operating condition and a non-operating condition, and wherein, when the switch assembly is in the operating condition, the locking assembly cannot be changed from the locked condition to the unlocked condition.

26. A reciprocating saw comprising:
   a reciprocatable spindle for supporting a saw blade for reciprocating sawing movement;
   a body defining a longitudinal pivot axis and housing a motor and a drive mechanism driven by the motor, the drive mechanism selectively driving the spindle, the body having a forward end supporting the spindle and a rearward end; and a D-shaped handle engageable by a hand of an operator, the D-shaped handle being connected to the rearward end of the body for pivoting movement relative to the body about the pivot axis.

27. The reciprocating saw as claimed in claim 26, wherein the handle axis is oriented at a substantially perpendicular angle relative to the pivot axis.

28. The reciprocating saw as claimed in claim 26, further comprising a battery supported handle, the battery being electrically connectable to the motor to supply power to the motor.

29. The reciprocating saw as claimed in claim 26, further comprising a looking assembly for locking the handle in a pivoted position relative to the body.

30. The reciprocating saw as claimed in claim 29, wherein the locking assembly includes a recess defined by one of the body and the handle and a projection defined by another of the body handle, projection being engageable in the recess to lock the handle in a pivoted position relative to the body.

31. The reciprocating saw as claimed in claim 30, wherein the locking assembly includes a first recess and a second recess defined byte one of the body and the handle, and wherein the projection is selectively engageable in the first recess to lock the handle in a first pivoted position relative to the body and in the second recess to lock the handle in a second pivoted position relative to the body.

32. The reciprocating saw as claimed in claim 26, further comprising a switch assembly operable to electrically connect the motor to a power source, at least a portion of the switch assembly being supported on the handle for pivoting movement about the pivot axis with the handle.

33. The reciprocating saw as claimed claim 32, further comprising a wiring arrangement electrically connecting the switch assembly to the motor and accommodating pivoting movement of the switch assembly with the handle about the pivot axis and relative to the motor.

34. The reciprocating saw as claimed in claim 32, further comprising a locking assembly for locking the handle in a pivoted position relative to the body, the locking assembly having a locked condition and an unlocked condition, and wherein the switch is inoperable when the locking assembly is in the unlocked condition.

35. The reciprocating saw as claimed in claim 32, wherein the switch assembly has an operating condition and an non-operating condition, and wherein the reciprocating saw further comprises a locking assembly for locking the handle in a pivoted position relative to the body, the locking assembly having a locked condition and an unlocked condition, and wherein, when the switch assembly is in the operating condition, the locking assembly cannot be changed from the locked condition to the unlocked condition.

36. The reciprocating saw as claimed in claim 32, wherein the switch assembly is inoperable during pivoting movement of the handle about the pivot axis.

37. The reciprocating saw as claimed in claim 32, wherein the motor is inoperable during pivoting movement of the handle about the pivot axis.

38. The reciprocating saw as claimed in claim 26, further comprising a grip portion provided by the body and engageable by an oilier hand of the operator, the grip portion being substantially parallel to the pivot axis.

39. The reciprocating saw as claimed in claim 26, wherein a radial annular projection extends circumferentially around at least a portion of a circumference of one of the rearward end of the body and the handle, wherein another of the rearward end of the body and the handle define a radial annular groove extending circumferentially around at least a portion of a circumference of the other of the rearward end of the body and the handle, the annular projection being engaged with and travelling in the annular groove daring pivoting movement of the handle about the pivot axis.

40. The reciprocating saw as claimed in claim 26, further comprising a pivot-limiting assembly for limiting pivoting movement of the handle relative to the body from a first pivoted position beyond a second pivoted position.

41. The reciprocating saw as claimed in claim 40, wherein the pivot-limiting assembly includes a first pivot-limiting member supported by one of the handle and the body and a second pivot-limiting member defined by another of the handle and the body, the first pivot-limiting member being engageable with the second pivot-limiting member to prevent movement of the handle relative to the body beyond the second pivoted position.

42. The reciprocating saw as claimed in claim 40, wherein the pivot-limiting assembly prevents pivoting movement of the handle relative to the body, in a first direction, from the first pivoted position beyond the second pivoted position and, in a second direction opposite to the first direction, from the first pivoted position beyond the second pivoted position.

43. The reciprocating saw as claimed in claim 42, wherein the first pivot-limiting member has a first surface engageable with the second pivot-limiting member during pivoting movement in the first direction and a second surface engageable with the second pivot-limiting member during pivoting movement in the second direction.

44. The reciprocating saw as claimed in claim 43, wherein the first pivot-limiting member is movable between a first limit position, in which the second pivoted position is defined by engagement of the first pivot-limiting member and the second pivot-limiting member, and a second limit position in which the second pivoted position is defined by engagement of the first pivot-limiting member and the second pivot-limiting member.

45. The reciprocating saw as claimed in claim 44, wherein the first pivot-limit member is pivotable between the first limit position and the second limit position about an axis substantially parallel to the pivot axis.

46. A reciprocating saw comprising:
  a reciprocatable spindle for supporting a saw blade for reciprocating sawing movement;
  a body defining a pivot axis and housing a motor and a drive mechanism driven by the motor, the drive mechanism selectively driving the spindle, the body having a forward end supporting the spindle and a rearward end; and
  a grip engageable by a hand of an operator, the grip being connected to the rearward end of the body for pivoting movement relative to the body about the pivot axis;
  wherein a radial annular projection extends circumferentially around at least a portion of a circumference of one of the rearward end of the body and the grip, and wherein another of the rearward end of the body and the grip define a radial annular groove extending circumferentially around at least a portion of a circumference of the other of the rearward end of the body and the grip, the annular projection being in engaged with and travelling in annular groove during pivoting movement of the grip about the pivot axis.

47. The reciprocating saw as claimed in claim 46, further comprising a battery supported by the grip, the battery being electrically connectable to the motor to supply power to the motor.

48. The reciprocating saw as claimed in claim 46, further comprising a locking assembly for locking the grip in a pivoted position relative to the body.

49. The reciprocating saw as claimed in claim 46, wherein the grip is a D-shaped handle.

50. A reciprocating saw comprising:
   a reciprocatable spindle for supporting a saw blade for reciprocating sawing movement;
   a body defining a longitudinal pivot axis and housing a motor and a drive mechanism driven by the motor, the drive mechanism selectively driving the spindle, the body having a forward end supporting the spindle and a rearward end; and
   a grip engageable by a hand of an operator, the grip being connected to the rearward end of the body for pivoting movement relative to the body about the pivot axis.

51. The reciprocating saw of claim 50, wherein the grip has a first end and a second end and defines a grip axis extending between the first end and the second end, and wherein the grip axis is oriented at a non-parallel angle relative to the pivot axis.

52. The reciprocating saw of claim 51, wherein the pivot axis and the grip axis define an angle of between thirty degrees and ninety degrees.

53. The reciprocating saw of claim 51, wherein the grip axis is oriented at a substantially perpendicular angle relative to the pivot axis.

54. The reciprocating saw as claimed in claim 50, further comprising a battery supported by the grip, the battery being electrically connectable to the motor to supply power to the motor.

55. The reciprocating saw as claimed in claim 50, futher comprising a locking assembly for locking the grip in a pivoted position relative to the body.

56. The reciprocating saw as claimed in claim 50, wherein the grip is a D-shaped handle.

57. The reciprocating saw as claimed in claim 50, further comprising:
   a switch assembly operable to electrically connect the motor to a power source, at least a portion of the switch assembly being supported on the grip for pivoting movement with the grip; and
   a locking assembly for Jacking the grip in a pivoted position relative to the body, the locking assembly having a locked condition and an unlocked condition, and wherein the switch is inoperable when the locking assembly is in the unlocked condition.

58. The reciprocating saw as claimed in claim 37, wherein the switch assembly has an operating condition and a non-operating condition, and wherein, when the switch assembly is in the operating condition, the locking assembly cannot be changed from the locked condition to the unlocked condition.

59. The power tool as claimed in claim 50, further comprising a switch assembly operable to electrically connect the motor to a power source, at least a portion of the switch assembly being supported on the grip for pivoting movement about the pivot axis with the grip.

60. The power tool as claimed in claim 59, further comprising a wiring arrangement electrically connecting the switch assembly to the motor and accommodating pivoting movement of the switch assembly with the grip about the pivot axis and relative to the motor.

61. The power tool as claimed in claim 50, wherein the grip is connected to the rearward end of the body for pivoting movement relative to the motor about the pivot axis.

62. The power tool as claimed in claim 50, wherein the grip is connected to the rearward end of the body for pivoting movement relative to the drive mechanism about the pivot axis.

* * * * *